March 1, 1966 P. M. McPHERSON 3,238,368
ABSORPTION ANALYSING APPARATUS WITH MEANS FOR REFLECTING
SHORT WAVELENGTH ULTRAVIOLET RADIATION ALONG
MEASURING AND REFERENCE OPTICAL PATHS
Filed March 4, 1963
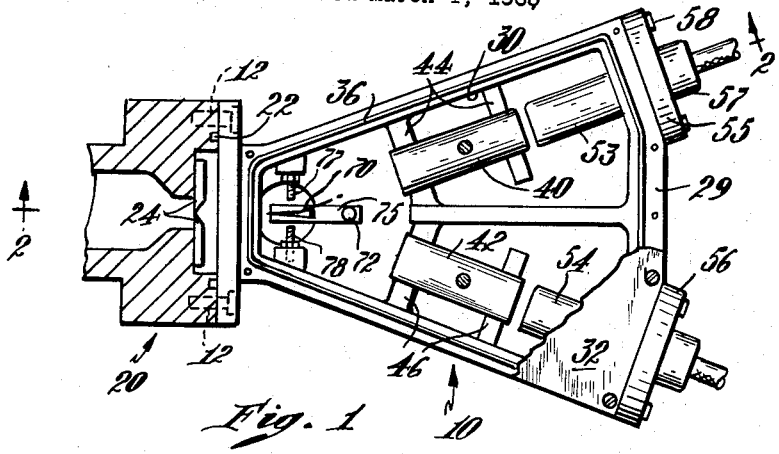
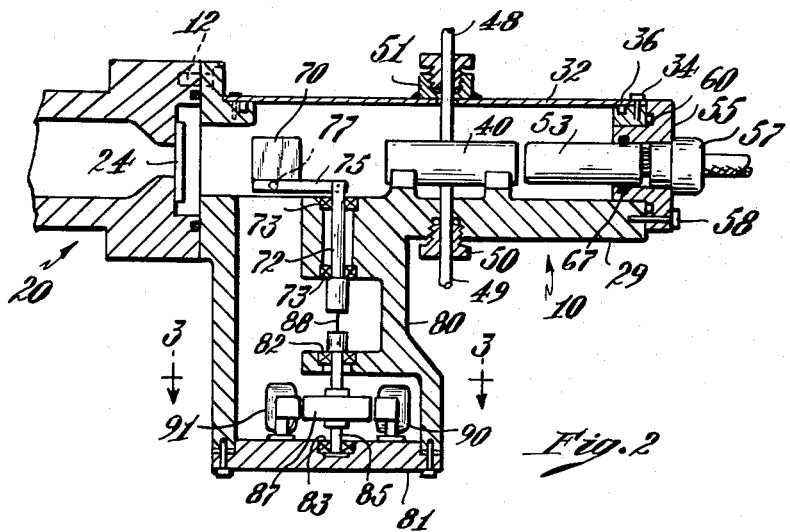
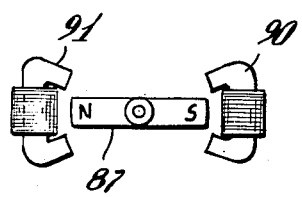
INVENTOR.
Paul M. McPherson
BY
Roberts, Cushman & Grover
ATT'YS 3,238,368
ABSORPTION ANALYSING APPARATUS WITH MEANS FOR REFLECTING SHORT WAVELENGTH ULTRAVIOLET RADIATION ALONG MEASURING AND REFERENCE OPTICAL PATHS
Paul M. McPherson, Acton, Mass., assignor to McPherson Instrument Corporation, Acton, Mass., a corporation of Massachusetts
Filed Mar. 4, 1963, Ser. No. 262,559
10 Claims. (Cl. 250—43.5)

This invention relates to spectroscopy and more particularly to a double beam measuring apparatus usable in the vacuum ultraviolet.

Absorption studies in the short wavelength regions have heretofore been hampered by the lack of a usable double beam or other comparison system by which the energy transmitted through the sample at a given wavelength may be compared with the incident energy. Such a system is particularly necessary in the short wavelength regions because of the large spectral discontinuities found in the energy outputs of the available light sources. Most conventional double beam systems are unusable for wavelengths much shorter than 2000 A. because, in these prior art systems, each beam must be reflected several times, usually at right angles. For shorter wavelengths the mirror surfaces absorb too much energy for reasonable overall efficiency. The lack of an effective double beam system similarly hampers the testing and calibration of window materials and detecting elements for use in these wavelength regions.

Objects of the invention are to provide a double beam measuring device which exhibits optical efficiency in at least a large portion of the so-called vacuum ultraviolet wavelength region. Further objects are to provide such a double beam device which is simple in construction and operation, which is highly reliable, which produces accurate results.

To direct radiation from a given source down each of a measuring optical path and a reference optical path, so that comparison measurements may be obtained, the present invention contemplates utilizing the increased reflectivity properties obtainable by employing a mirror element at grazing incidence. To further limit the loss of energy due to manipulating the beam paths, only one reflection is used in each of the two beam paths. These reflections are produced by a single mirror element which is located in the path of the incoming radiation from the source and which is oscillated between two positions, the first position being such that the incoming beam is reflected at grazing incidence down the reference optical path and the second position being such that the beam is reflected at equally grazing incidence down the measuring optical path. Preferably the mirror element is wedge-shaped with the point of the wedge being traversed across the width of the incoming beam during the oscillation of the mirror element.

In another aspect of the invention the mirror element is oscillated in such a manner that there is a substantial dwell at each of the above-mentioned positions. In this way also the efficiency, with which the incoming energy is utilized, is increased. In a preferred embodiment the mirror element is oscillated by being elastically coupled to a mechanically resonant system, the displacement of the mirror element in response to the resonant oscillation forces being limited by appropriate stops which determine the aforesaid positions.

For the purpose of illustration a preferred embodiment of the invention is shown in the accompanying drawing in which FIG. 1 is a plan view of a double beam absorption measuring apparatus, the cover thereto being partially broken away;

FIG. 2 is a section substantially on the line 2—2 of FIG. 1;

FIG. 3 is a section on the line 3—3 of FIG. 2.

Referring now to the drawings the double beam apparatus 10 is illustrated as attached, by screws 12, to the exit slit assembly 20 of a suitable source of ultraviolet radiation. A vacuum seal is provided by the O-ring 22. An appropriate source of radiation is the monochromator shown in my copending patent application Serial No. 170,004 filed January 31, 1962, now U.S. Patent 3,090,863, and entitled, Spectrometric Apparatus. This monochromator apparatus will provide, through the aperture defined by the exit slit jaws 24, a beam of radiation into the main chamber of the double beam apparatus 10.

The double beam apparatus 10 itself comprises a housing 29 which provides a generally V-shaped chamber part 30. The chamber is closed by a cover 32 which is secured to the housing 29 by screws 34 and sealed by an O-ring 36. A wedge shaped mirror element 70 is supported in line with the monochromator exit slit on a bar 75. The bar 75 is mounted on a shaft 72 journaled in bearing 73 set in the housing 29. Adjustable stops 77 and 78 are provided for limiting the swinging of the bar 75 to such an extent that the incoming beam of radiation impinges upon one side of the wedge shaped mirror element 70 when the bar 75 is at one extreme of its swing and impinges upon the opposite side of the mirror element 70 when the bar is at its other extreme. The wedge angle, the length of the bar 75 and the setting of the stops 77 and 78 are determined in relation to each other so that the incident beam always impinges upon the reflective sides of the mirror element 70 at grazing incidence. The angle of incidence necessary to obtain adequate reflectivity will, of course, depend upon the wavelength of the incident radiation but, as used herein and in the claims, the term "grazing incidence" shall be understood to mean an angle of incidence of greater than 70° as conventionally defined relative to a perpendicular to the reflecting surface. The alternate paths taken by the reflected beam of radiation are employed as a measuring optical path and a reference optical path respectively.

Within the chamber part 30 and aligned with the measuring and reference optical paths respectively are two similar sealed cells 40 and 42 which hereinafter will be treated as the sample cell and reference cell respectively. The cells rest in V-blocks 44 and 46 respectively which serve to keep the cells properly aligned within the system. Each of the cells is provided with connection tubes 48 and 49 by means of which they may be evacuated and through which a sample may be introduced into the cell 40. These tubes pass through appropriate sealed fittings 50 and 51 in the floor of the chamber 30 and the cover 32 respectively. The cells 40 and 42 can be of essentially conventional construction bearing in mind that the wavelengths contemplated are in the vacuum ultraviolet region. Typically the windows in these cells will be of lithium fluoride for adequate transmission of vacuum ultraviolet radiation or, for extremely short wavelengths, windows of unbacked metal films can be used.

In line with each of the cells 40 and 42 is provided a photomultiplier tube 53 and 54. The cathode faces of the photomultipliers are coated with a suitable fluorescent detecting substance, such as sodium salicylate, for rendering the tubes sensitive to ultraviolet radiation. Each photomultiplier tube is supported by a suitable mount 55, 56 which incorporates an encapsulated socket assembly 57 including the voltage dropping resistors necessary for the operation of the photomultiplier. Each photomultiplier is sealed into its mount by an O-ring 67 and the mount itself is secured within a corresponding aperture in the walls of the chamber 30 by screws 58, an appropriate seal being provided by another O-ring 60. Under appropriate circumstances other types of detecting elements, such as thermocouples, can be substituted for the photomultipliers illustrated.

The housing 29 also includes a depending portion 80 which is closed by the sealed cap 81. Within this depending portion is journaled, in bearing 82 and 83, a shaft 85 which is coaxial with the shaft 72 and which carries a transverse permanent magnet element 87. The shaft 85 is elastically coupled to the shaft 72 by a torsion spring 88. In that the rotation of the shaft 72 is limited to a quite small angle by the stops 77 and 78, the torsion spring 88 and the rotational inertia of the magnet 87 form a mechanically resonant system. Adjacent the magnet are mounted a pair of electromagnetic coil assemblies 90 and 91 for driving the resonant system.

Once the balance of the two optical paths is established or corrected for, the operation of the apparatus to test the absorption of a sample is as follows.

A sample, typically a gas, is introduced into the previously evacuated cell 40 through the tubes 48 and 49 and the cell 42 is left evacuated. The chamber 30 is also evacuated either independently (not shown) or by the vacuum system associated with the monochromator. By energizing the coils 90–91 with pulsed electric current at an appropriate repetition rate, the mechanically resonant system comprising the transverse magnet 87, shaft 85, and the torsion spring 88 can be driven into oscillation. As the opposite end of the torsion spring 88 is held by the shaft 72 carrying the mirror 70, the mirror will also be oscillated although the extent of its movement is sharply limited or clipped by the stops 77 and 78. The motion of the mirror 70 is thus characterized by a substantial dwell in each of its extreme positions, the movement between the two possible positions being executed rapidly.

As a result of this movement of the mirror element 70, a beam of radiation entering the chamber 30 through the slit defined by the jaws 24 will be reflected, at grazing incidence, first into the sample cell 40 and then into the reference cell 42. The amount of radiation passing through each of the cells is measured by means of the photomultipliers 53 and 54 respectively, these measurements providing a basis for calculating the absorption of a sample contained in the cell 40. In that the reflectivity of the mirror element 70 is enhanced by its operation at grazing incidence and its motion is characterized by long dwells and short periods of movement, a large portion of the radiant energy available is utilized in the measuring process. It will also be readily understood that the electrical signals obtained from the photomultiplier are already chopped so as to be acceptable to conventional A.C. electronics. Further, since the chopping is performed optically, the desired signal can be quite readily separated from any extraneous noise present in the electronics system.

Balance of the two optical paths can be checked in an essentially similar manner with the sample cell 40 being evacuated instead of containing a sample. Any unbalance in the system can be compensated for by adjusting the relative gains of the electronic circuits to which the respective photomultipliers 53 and 54 are connected.

As will be apparent to those skilled in the art, the apparatus according to the present invention is also admirably suited for measuring the transmission quality of prospective window materials, in which case the containing cells may be dispensed with, or for calibrating photodetectors against a standard. In this latter case it will often be desirable to calibrate a detector of unknown characteristics, such as a photomultiplier, against a thermocouple so that a calibration in terms of absolute energies can be obtained.

As the radiation emerging from the slit will typically be in the form of a diverging beam, it is also contemplated that the reflecting surfaces of the mirror element 70 be of a concave configuration so as to concentrate the energy available into the cells. The concave surfaces may be spherical or cylindrical according to the overall needs of the system. Depending on the experiment to be performed and the length of the sample cells used, the mirror element surfaces, may, for example, be of concavity sufficient to focus the radiation within the sample cell or alternatively to essentially collimate the beam.

While a particular embodiment has been described and certain modifications suggested it should be understood that this disclosure is for the purpose of illustration and that the present invention includes all modifications and equivalents falling within the scope of the appended claims.

I claim:

1. Spectrometric apparatus for use at short wavelengths comprising: an evacuable chamber, said chamber having an aperture through which a beam of radiation can be admitted; means defining a measuring optical path and a reference optical path, said paths forming an acute angle and being oriented so that the axis of a beam of radiation admitted through said aperture bisects said angle; a wedge-shaped mirror element located in the path of a beam of radiation admitted through said aperture and oscillatable between two positions, the point of the wedge being traversable across the width of a beam of radiation admitted through said aperture, the first position being such that a beam of radiation admitted through said aperture is diverted with a single reflection at graving incidence down said measuring optical path and the second position being such that the beam is diverted with a single reflection at equally grazing incidence down said reference optical path; and, in each of said paths, means responsive to the intensity of radiation present.

2. Apparatus according to claim 1 in which the sides of the wedge-shaped mirror element are concave.

3. Apparatus according to claim 2 in which the concavity of each side of the wedge-shaped mirror element is such as to substantially collimate a beam of radiation admitted through said aperture.

4. Apparatus for measuring the absorption of ultraviolet radiation by a sample comprising: an evacuable chamber, said chamber having an aperture through which a beam of radiation can be admitted; a sample cell; a reference cell; a wedge-shaped mirror element located in the path of a beam of radiation admitted through said aperture and oscillatable between two positions, the point of the wedge being traversable across the width of the beam, the first position being such that a beam of radiation admitted through said aperture is diverted with a single reflection at grazing incidence into said sample cell and the second position being such that the beam is diverted with a single reflection at equally grazing incidence into said reference cell; and means for measuring the intensity of radiation passing through each of said cells.

5. Apparatus according to claim 4 in which the sides of the wedge-shaped mirror element are concave.

6. Apparatus according to claim 5 in which the concavity of each side of the wedge-shaped mirror element is such as to focus the beam of radiation in the respective cell.

7. Apparatus for measuring the absorption of ultraviolet radiation by a sample comprising: an evacuable chamber, said chamber having an aperture through which a beam of radiation can be admitted; a sample cell; a reference cell; means for measuring the intensity of radiation passing through each of said cells; a wedge-shaped mirror element located in the path of a beam admitted through said aperture and rotatable between two positions about an axis perpendicular to the beam, the first position being such that the beam of radiation is reflected at grazing incidence into said sample cell and the second position being such that the beam is reflected at equally grazing incidence into said reference cell; a magnetically permeable mass rotatable coaxially with said mirror element; a torsion spring coupling said mirror element and said magnetically permeable mass; electromagnetic means for operating on said magnetically permeable mass; and means for energizing said electromagnetic means at the resonant frequency determined by the rotational inertia of said magnetically permeable mass and the resilience of said torsion spring.

8. Apparatus for measuring energy in the extremely short wavelengths of vacuum ultraviolet radiation substantially below 2000 Angstroms, said apparatus comprising a housing forming an evacuable chamber, said chamber having an aperture, means on the housing to mount a source transmitting a beam of said radiation through said aperture and along a path in said chamber, movable mirror means in said housing on the direct path from said aperture, means for moving said mirror means between two positions in which said mirror means intercepts said beam at equal and opposite grazing incidence angles of 70° or greater with respect to the incident beam and alternately diverts the beam on a measuring optical path and a reference optical path at equal and opposite angles with respect to the incident beam, said mirror means comprising two reflecting surfaces each bounded by at least one edge, said mirror means being movable such that at least one edge traverses the beam from said aperture as the reflecting surfaces successively intercept said beam at said equal and opposite angles, and means to mount two radiation responsive detecting means respectively on the direct reflective measuring and reference optical paths from said movable mirror means, whereby substantial energy in said extremely short wavelengths of vacuum ultraviolet radiation is transmitted on the two paths with a single reflection for each path.

9. Apparatus for measuring energy in the extremely short wavelengths of vacuum ultraviolet radiation substantially below 2000 Angstroms, said apparatus comprising a housing forming an evacuable chamber, said chamber having an aperture, means on the housing to mount a source transmitting a beam of said radiation through said aperture and along a path in said chamber, movable mirror means in said housing on the direct path from said aperture, means for moving said mirror means between two positions in which said mirror means intercepts said beam at equal and opposite grazing incidence angles of 70° or greater with respect to the incident beam and diverts the beam on a measuring optical path and a reference optical path at equal and opposite angles with respect to the incident beam, said mirror means comprising two reflecting surfaces each bounded by at least one edge, said mirror means being movable such that at least one edge traverses the beam from said aperture as the reflecting surfaces successively intercept said beam at said equal and opposite angles, and means in the housing for detecting respective reflective beams, said detecting means being disposed respectively on the direct reflective measuring and reference optical paths from said movable mirror means, thereby to receive substantial energy in said extremely short wavelengths of vacuum ultraviolet radiation with a single reflection from said mirror means.

10. Apparatus for measuring the absorption by a sample of energy in the extremely short wavelengths of vacuum ultraviolet radiation substantially below 2000 Angstroms, said apparatus comprising an evacuable chamber having an aperture and means to mount a source transmitting a beam of said radiation long a path through said aperture into said housing, movable mirror means in said housing on the direct path from said aperture, means for moving said mirror means between two positions in which said mirror means intercepts said beam at equal and opposite grazing incidence angles of 70° or greater with respect to the incident beam and alternately diverts the beam on a measuring optical path and a reference optical path at equal and opposite angles with respect to the incident beam, said mirror means comprising two reflecting surfaces each bounded by at least one edge, said mirror means being movable such that at least one edge traverses the beam from said aperture as the reflecting surfaces successively intercept said beam at said equal and opposite angles, a cell for holding said sample and a reference cell in said housing, said sample and reference cells being disposed respectively on the direct reflective measuring and reference optical paths from said movable mirror means, whereby substantial energy of said extremely short vacuum ultraviolet radiation is transmitted to the two cells with a single reflection of the same energy on each path, and means beyond said cells on said measuring and reference optical paths respectively for mounting means to measure the intensities of energy passing through respective cells.

References Cited by the Examiner
UNITED STATES PATENTS

| 1,746,525 | 2/1930 | Darrah | 250—43.5 |
| 2,525,445 | 10/1950 | Canada | 88—14 |
| 2,613,572 | 10/1952 | Mathieu | 250—43.5 |
| 2,653,249 | 9/1953 | Harker | 250—53 |
| 2,723,589 | 11/1955 | Bullock et al. | 250—43.5 |

RALPH G. NILSON, *Primary Examiner.*

W. F. LINDQUIST, *Assistant Examiner.*